(12) United States Patent
Hsu

(10) Patent No.: US 6,882,606 B2
(45) Date of Patent: Apr. 19, 2005

(54) OPTICAL DISC APPARATUS AND METHOD FOR RECORDING DATA ONTO AN OPTICAL DISC IN MULTIPLE WRITE SESSIONS

(75) Inventor: Tse-Hsiang Hsu, Hsin-Chu (TW)

(73) Assignee: MediaTek Inc., Hsin-Chu (TW)

(*) Notice: Subject to any disclaimer, the term of this patent is extended or adjusted under 35 U.S.C. 154(b) by 399 days.

(21) Appl. No.: 10/065,047

(22) Filed: Sep. 13, 2002

(65) Prior Publication Data
US 2004/0052173 A1 Mar. 18, 2004

(51) Int. Cl.$^7$ .................................................. G11B 7/00
(52) U.S. Cl. ................ 369/47.13; 369/53.1; 369/53.33; 369/59.1
(58) Field of Search .......................... 369/47.1, 47.13, 369/47.17, 53.1, 53.2, 53.33, 53.44, 59.1

(56) References Cited

U.S. PATENT DOCUMENTS 5,745,459 A * 4/1998 Inokuchi et al. ......... 369/53.21
6,621,783 B1 * 9/2003 Murata .................... 369/53.31
6,785,219 B1 * 8/2004 Sasaki et al. ............ 369/275.3

* cited by examiner

Primary Examiner—Muhammad Edun
(74) Attorney, Agent, or Firm—Winston Hsu

(57) ABSTRACT

A method for using an optical disc apparatus to record data onto an optical disc in multiple write sessions. The optical disc apparatus includes a delay detection circuit for detecting gaps between data written to the optical disc in successive write sessions. The method includes writing a set of first data to the optical disc, searching for an ending location of the first data, writing a set of test data to the optical disc such that a beginning location of the test data is near the ending location of the first data, using the delay detection circuit to detect a gap between the first data and the test data, and writing a set of second data to the optical disc such that a beginning location of the second data is equal to the beginning location of the test data minus a value contained in the gap.

10 Claims, 8 Drawing Sheets

OPTICAL DISC APPARATUS AND METHOD FOR RECORDING DATA ONTO AN OPTICAL DISC IN MULTIPLE WRITE SESSIONS

BACKGROUND OF INVENTION

1. Field of the Invention

The present invention relates to an optical disc apparatus, and more specifically, to a method for using an optical disc apparatus to accurately record data onto an optical disc in multiple write sessions.

2. Description of the Prior Art

When writing data to an optical disc, a writing session can be interrupted for many reasons. For example, one common cause is due to buffer under run, in which a buffer that stores data to be written prematurely runs out of data during a write session. While interruptions during a writing session cannot be avoided completely, in U.S. Pat. No. 6,198,707 entitled "Optical disc apparatus capable of multiple write sessions in a single track", Yamamoto discloses a prior art optical device for handling write interruptions, which is included herein by reference. The prior art device is able to perform multiple write sessions on a single track of an optical device, thereby reducing problems associated with a write interruption.

Please refer to FIG. 1. FIG. 1 is a diagram of an optical disc apparatus 10 according to the prior art. A pickup 14 reads data from and writes data to an optical disc 12. When reading, read data is sent from the pickup 14 to a read path circuit 16, which handles read operations of the optical disc apparatus 10. The read path circuit 16 then sends data to an interface and buffer 18, which allows the optical disc apparatus 10 to communicate with a host computer and to hold data in a buffer. When writing, data to be written is taken from the interface and buffer 18 and sent to a write path circuit 19, which handles write operations of the optical disc apparatus 10. The write path circuit 19 then sends data to the pickup 14 for writing the data onto the optical disc 12.

Suppose that the optical disc apparatus 10 is interrupted during a write operation. First data was written to the optical disc 12 during the first write operation. Since the first data does not contain all desired data, which is data that was intended to be written onto the optical disc 12, the optical disc 12 will be ruined if the remaining portion of the desired data is not later written onto the optical disc 12. To handle this situation, the prior art teaches a method of writing second data onto the optical disc 12 in a separate write session. With the prior art method, second data is written onto the same track that the first data was terminated on.

Please refer to FIG. 2. FIG. 2 is a flowchart illustrating writing multiple sessions to a single track of an optical disc according to the prior art. Steps contained in the flowchart will be explained below.

Step 100: Start;

Step 102: Write first data onto the optical disc 12;

Step 104: Search for an ending location of the first data;

Step 106:

Begin writing second data in a new write session onto the same track on which the first data was terminated. The second data is written beginning at a starting location which is a fixed distance from the ending location of the first data; and Step 108: End.

In summary, the starting location of the second data is always a same fixed distance from the ending location of the first data. Unfortunately, propagation delay in the read path circuit 16, the interface and buffer 18, and the write path circuit 19 make it difficult to precisely calibrate the optical disc apparatus 10 such that the starting location of the second data is immediately after the ending location of the first data.

Counters can be used to count sub-channel information such as the Q-code present in each sector of the optical disc 12. Furthermore, an eight to fourteen modulation (EFM) clock can be used to count sectors in the optical disc 12, and to help determine starting and ending locations of data written to the optical disc 12. Therefore, when the second data is written a fixed distance after the ending location of the first data, it is equivalent to saying that the second data is written a fixed time (as counted by clock signals) after the ending location of the first data.

Please refer to FIG. 3. FIG. 3 is a timing diagram showing a delay gap between first data and second data written to the optical disc 12 using the prior art optical disc apparatus 10. Desired data that is to be written to the optical disc 12 during a write operation is shown at the top of FIG. 3. For convenience, only a section of desired data from time=0 to time=13 is shown. Next, first data is shown starting at time=0 until a write interruption which occurs at time=6.

After the first data has been written, the prior art method includes searching for the ending location of the first data, and writing the second data starting at a fixed distance from the ending location of the first data. This entails using the pickup 14 to read the first data from the optical disc 12, and sending the first data through the read path circuit 16 to the interface and buffer 18. Once the ending location of the first data is detected, the second data (which is the remaining part of the desired data that was not included in the first data) to be written is sent through the write path circuit 19 to the pickup 14 and is then written onto the optical disc 12. Unfortunately, it is very difficult to accurately place the starting location of the second data immediately following the ending location of the first data. Therefore, as shown in FIG. 3, the beginning location of the second data is equal to a fixed time FT after the ending location of the first data. Thus, instead of the beginning location of the second data being located at time=6, the beginning location is actually at time=8 due to the fixed time FT delay. Note that the value of the fixed time FT associated with optical disc apparatus 10 may have a positive value or a negative value.

The example shown in FIG. 3 illustrates a case in which the fixed time FT has a positive value. Unfortunately, if the positive value is too large, the first and second data will have a large separation between them. This can cause synchronization to be lost between the first and second data, and all second data will be lost when later read by the optical disc apparatus 10. On the other hand, if the fixed time FT has a negative value, the beginning portion of the second data will overwrite the last part of the first data, thereby losing part of the desired data. Furthermore, since the optical disc apparatus 10 always uses the same fixed time FT to separate multiple write sessions written on a single track, an incorrect value of the fixed time FT will cause problems throughout the life of the optical disc apparatus 10.

SUMMARY OF INVENTION

It is therefore a primary objective of the claimed invention to provide a method for using an optical disc apparatus to record data onto an optical disc in multiple write sessions without any gap between successive write sessions in order to solve the above-mentioned problems.

According to the claimed invention, a method for using an optical disc apparatus to record data onto an optical disc in multiple write sessions is disclosed. The optical disc apparatus includes a delay detection circuit for detecting gaps between data written to the optical disc in successive write sessions. The method includes writing a set of first data to the optical disc, searching for an ending location of the first data on the optical disc, writing a set of test data to the optical disc such that a beginning location of the test data is approximately equal to the ending location of the first data, using the delay detection circuit to detect a gap between the first data and the test data, the gap being calculated by subtracting the ending location of the first data from the beginning location of the test data, and writing a set of second data to the optical disc such that a beginning location of the second data is equal to the beginning location of the test data minus a value contained in the gap.

It is an advantage of the claimed invention that the optical disc apparatus uses the delay detection circuit to detect the gap between the first data and the test data, so that the starting location of the second data can be adjusted by this detected gap. Therefore, the second data is written immediately after the end of the first data, maintaining synchronization between the first data and the second data, and preventing the second data from overwriting portions of the first data.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
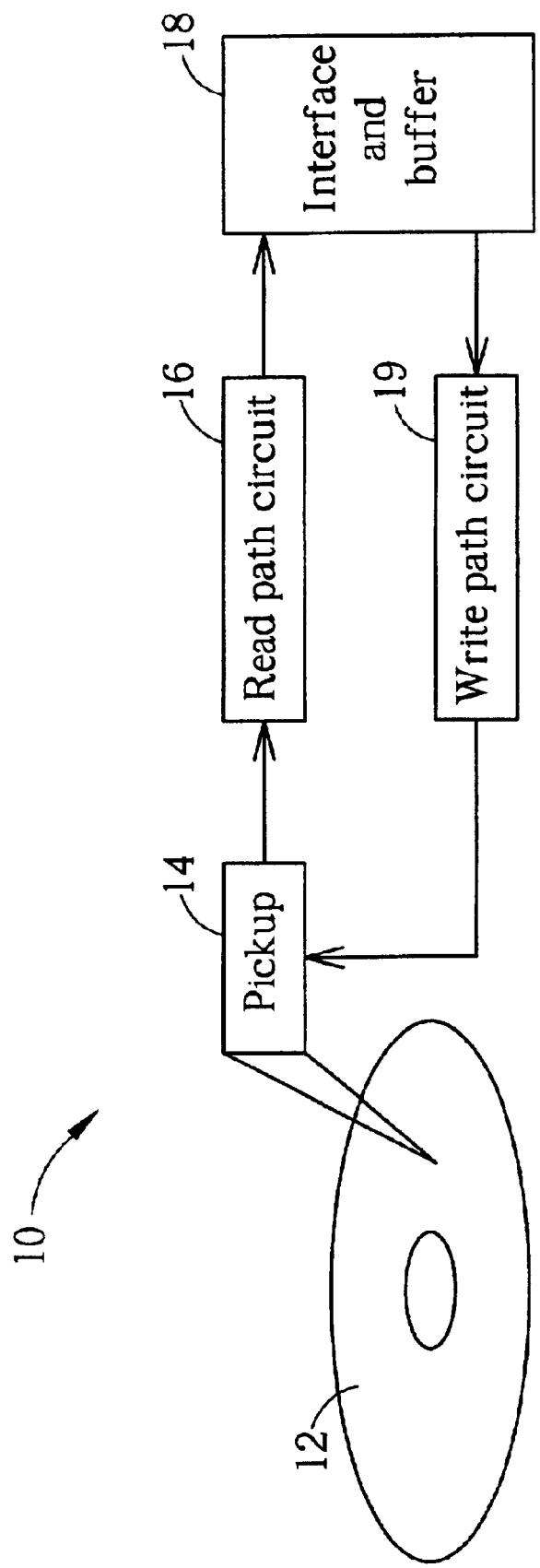
FIG. 1 is a diagram of an optical disc apparatus according to the prior art.
Figure 2:
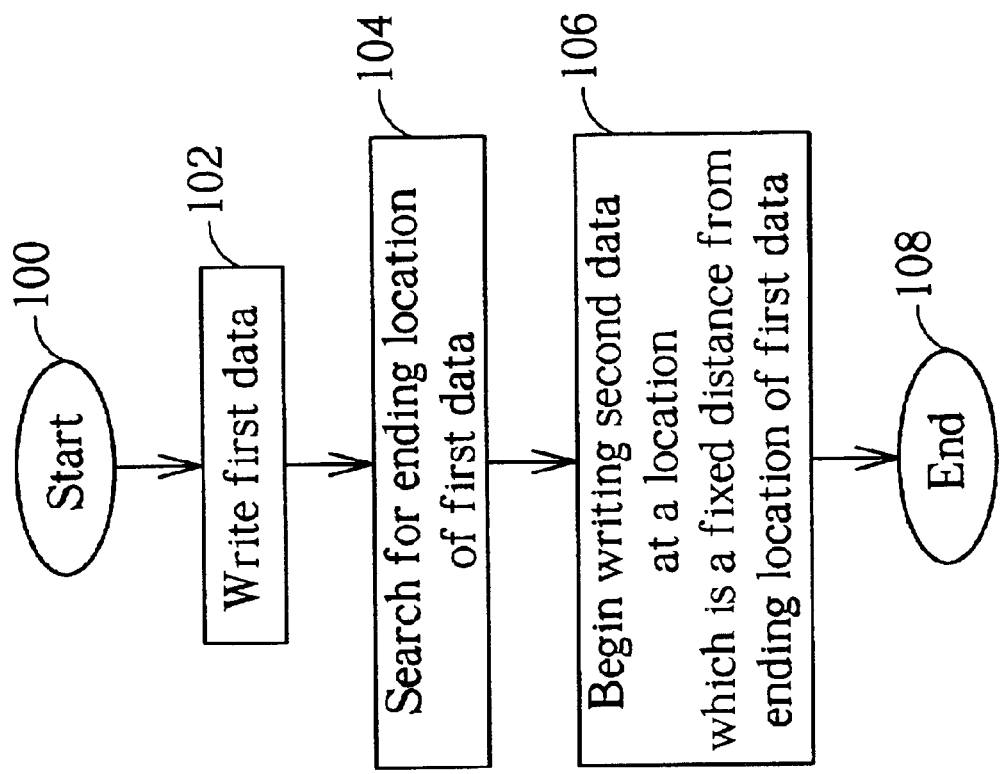
FIG. 2 is a flowchart illustrating writing multiple sessions to a single track of an optical disc according to the prior art.
Figure 3:
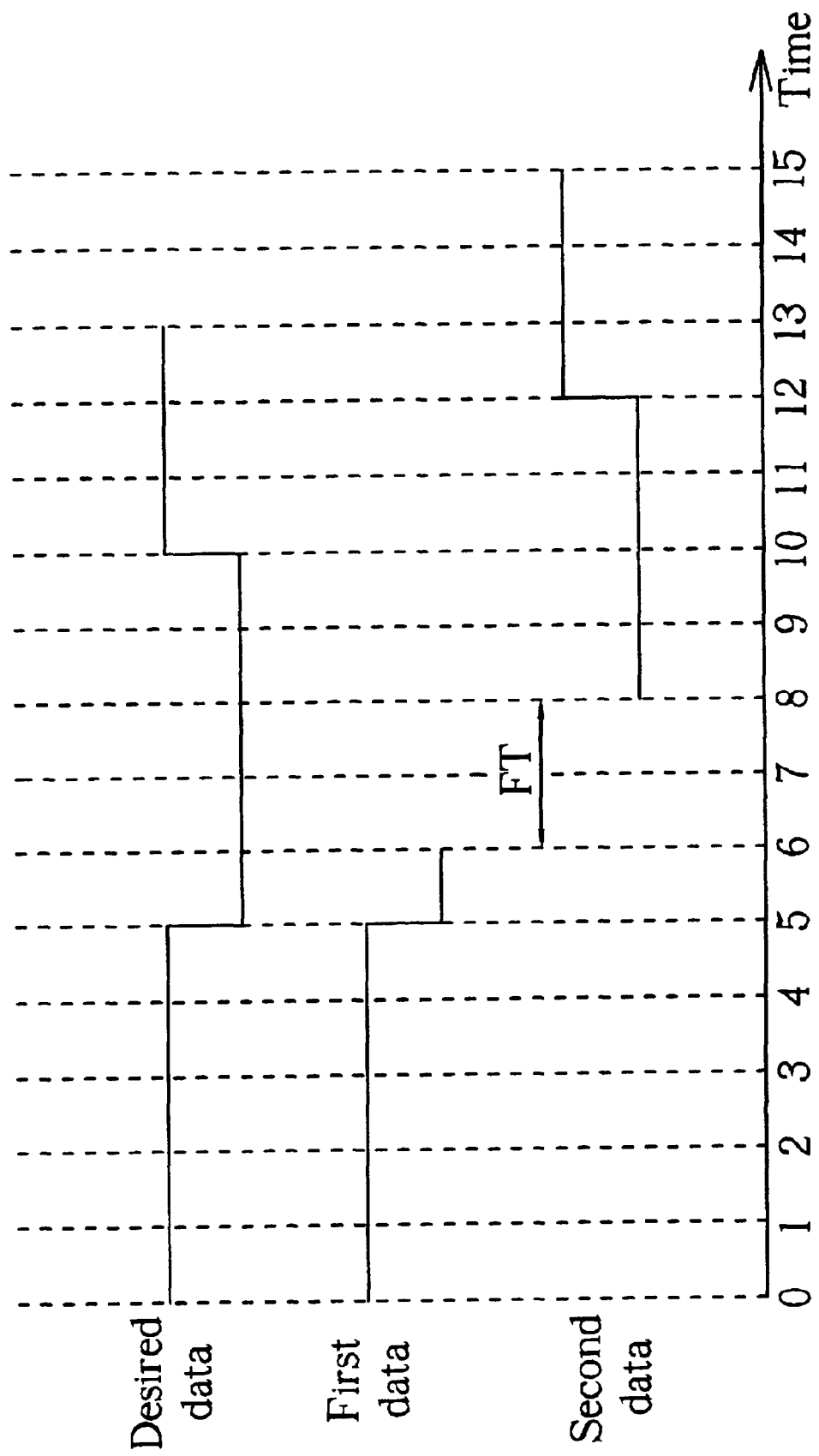
FIG. 3 is a timing diagram showing a delay gap between first data and second data written to the optical disc using the prior art optical disc apparatus.
Figure 4:
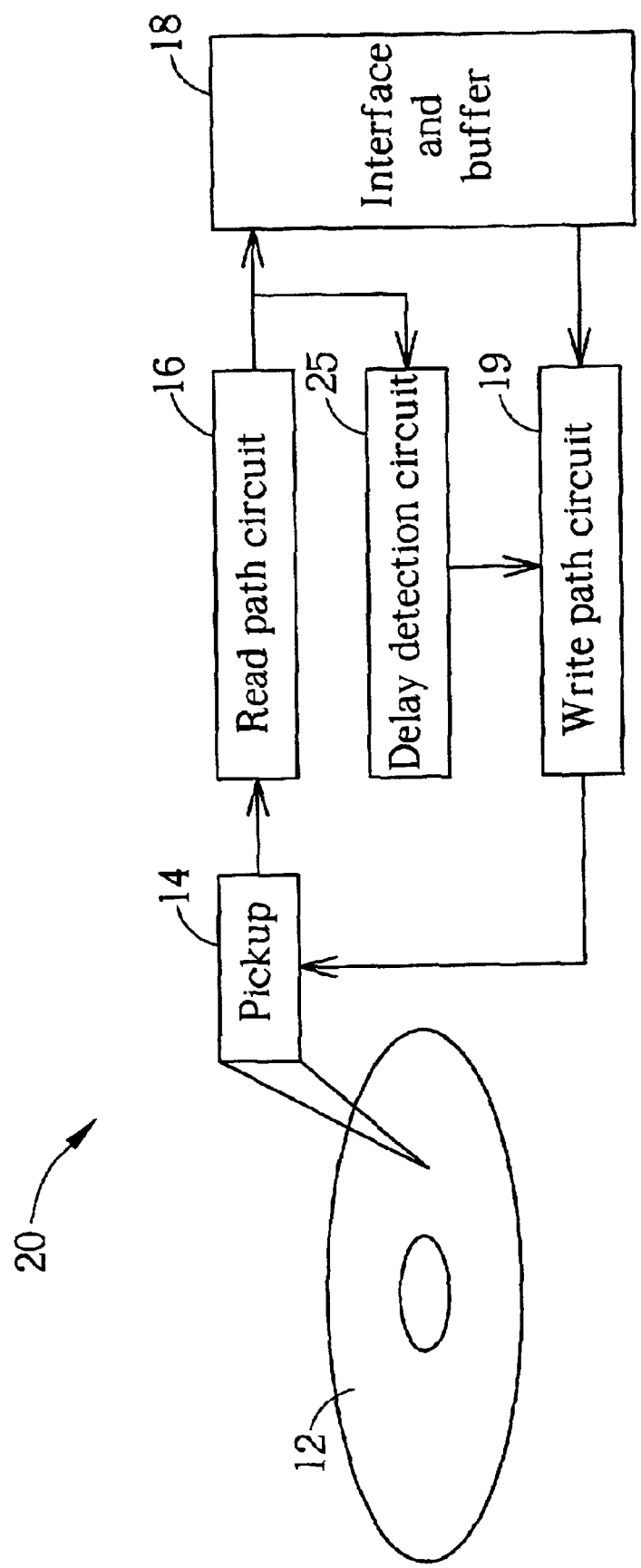
FIG. 4 is a diagram of an optical disc apparatus according to the present invention.

Please refer to FIG. 4. FIG. 4 is a diagram of an optical disc apparatus 20 according to the present invention. The optical disc apparatus 20 is nearly identical to the optical disc apparatus 10 of the prior art, and same reference numbers will be used for identical parts. The main difference is the optical disc apparatus 20 has a delay detection circuit 25 to identify and help eliminate delay gaps between two successive write sessions on a single track of an optical disc 12.

Figure 5:
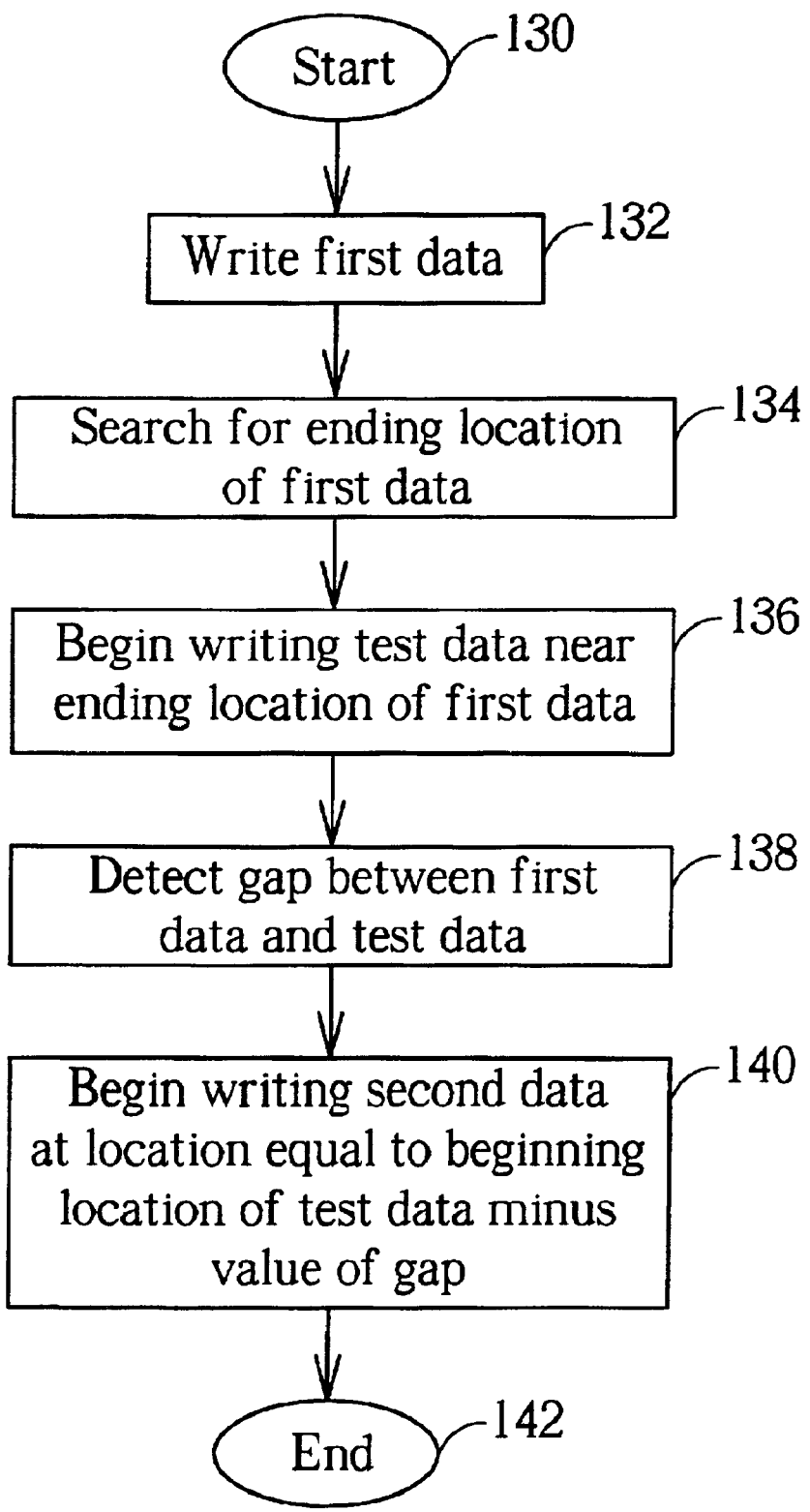
FIG. 5 is a flowchart illustrating writing multiple sessions to a single track of an optical disc according to the present invention method.

To better understand operation of the present invention optical disc apparatus 20, please refer to FIG. 5. FIG. 5 is a flowchart illustrating writing multiple sessions to a single track of an optical disc according to the present invention method. Steps contained in the flowchart will be explained below.

Step 130: Start;

Step 132: Write first data onto the optical disc 12;

Step 134: Use the read path circuit 16 to search for an ending location of the first data;

Step 136:

Use the write path circuit 19 to begin writing test data near the ending location of the first data;

Step 138:

Use the read path circuit 16 in conjunction with the delay detection circuit 25 to detect a delay gap between the first data and the test data;

Step 140:

Use the write path circuit 19 in conjunction with the delay detection circuit 35 to begin writing second data at a location equal to the beginning location of the test data minus a value of the delay gap; and Step 142: End.

Figure 6:
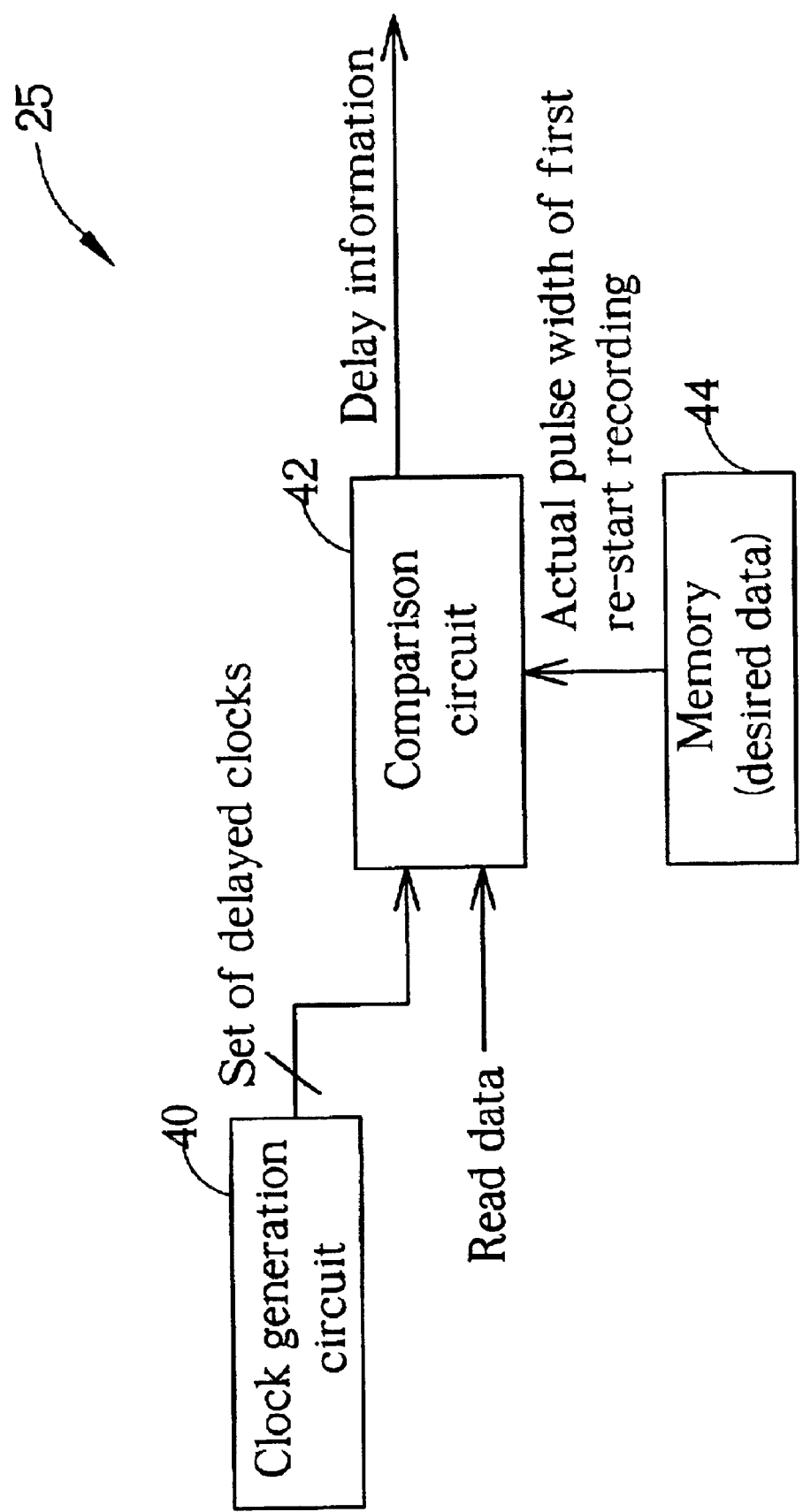
FIG. 6 is a functional block diagram of a delay detection circuit of the present invention optical disc apparatus.
Figure 7:
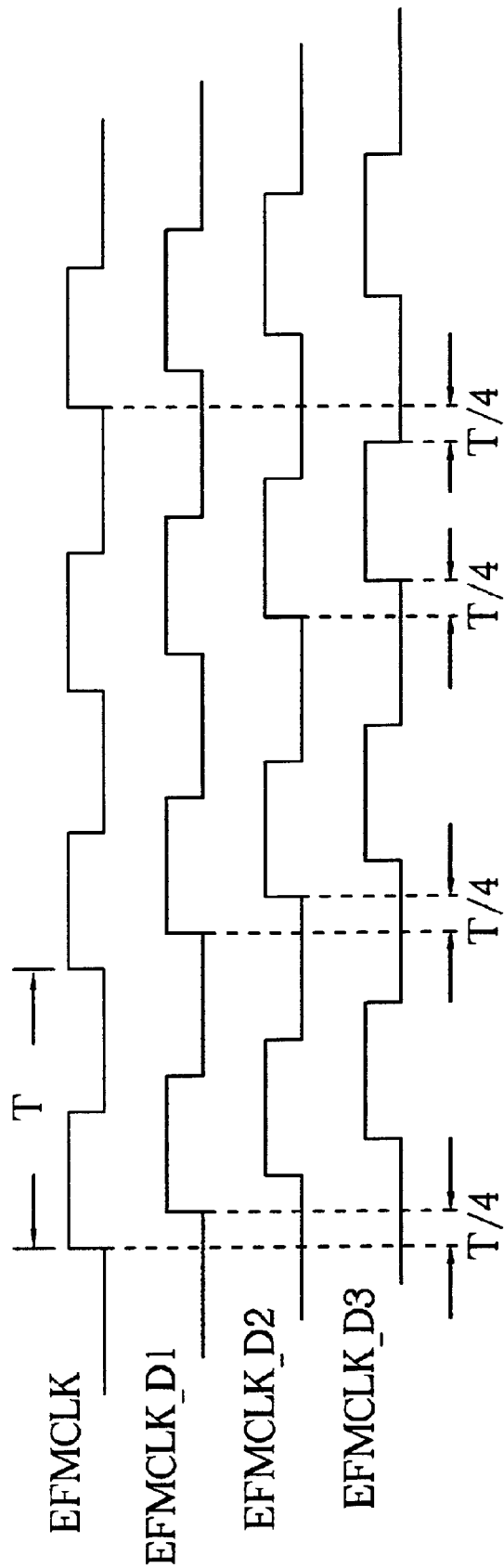
FIG. 7 is a timing diagram showing generation of EFM clock signals.

For a more complete discussion of the delay detection circuit 25, please refer to FIG. 6 and FIG. 7. FIG. 6 is a functional block diagram of the delay detection circuit 25 of the present invention optical disc apparatus 20. FIG. 7 is a timing diagram showing generation of EFM clock signals. The delay detection circuit 25 contains a clock generation circuit 40 for generating a set of EFM clocks, shown in FIG. 7. The clock generation circuit 40 takes a clock signal EFMCLOCK, and produces three delayed, out of phase versions of the clock signal in order to produce delayed clock signals EMFCLK_D1, EMFCLK_D2, and EMFCLK_D3. Each of these clock signals has a period of T. When using all four of these clock signals together, the effective period of the set of EFM clock signals becomes T/4, as shown in FIG. 7. By using four clock signals, the clock generation circuit 40 has four times the precision that was available with only one EFM clock. The use of four EFM clocks is used only as an example. Likewise, other numbers of clocks could be used such as 8, 16, and so on, in order to increase precision of the delay detection circuit 25 to a desired amount.

The delay detection circuit 25 also contains a memory 44 for storing desired data and a comparison circuit 42 for comparing the desired data to the read data (first data and test data which are read from the read path circuit) in order to detect a value of the delay gap. The comparison circuit is able to read and compare data on every active edge of the set of clocks generated by the clock generation circuit 40, which has an effective period of T/4. By comparing read data with the desired data stored in the memory 44, the comparison circuit 42 is able to determine the value of the delay gap.

Figure 8:
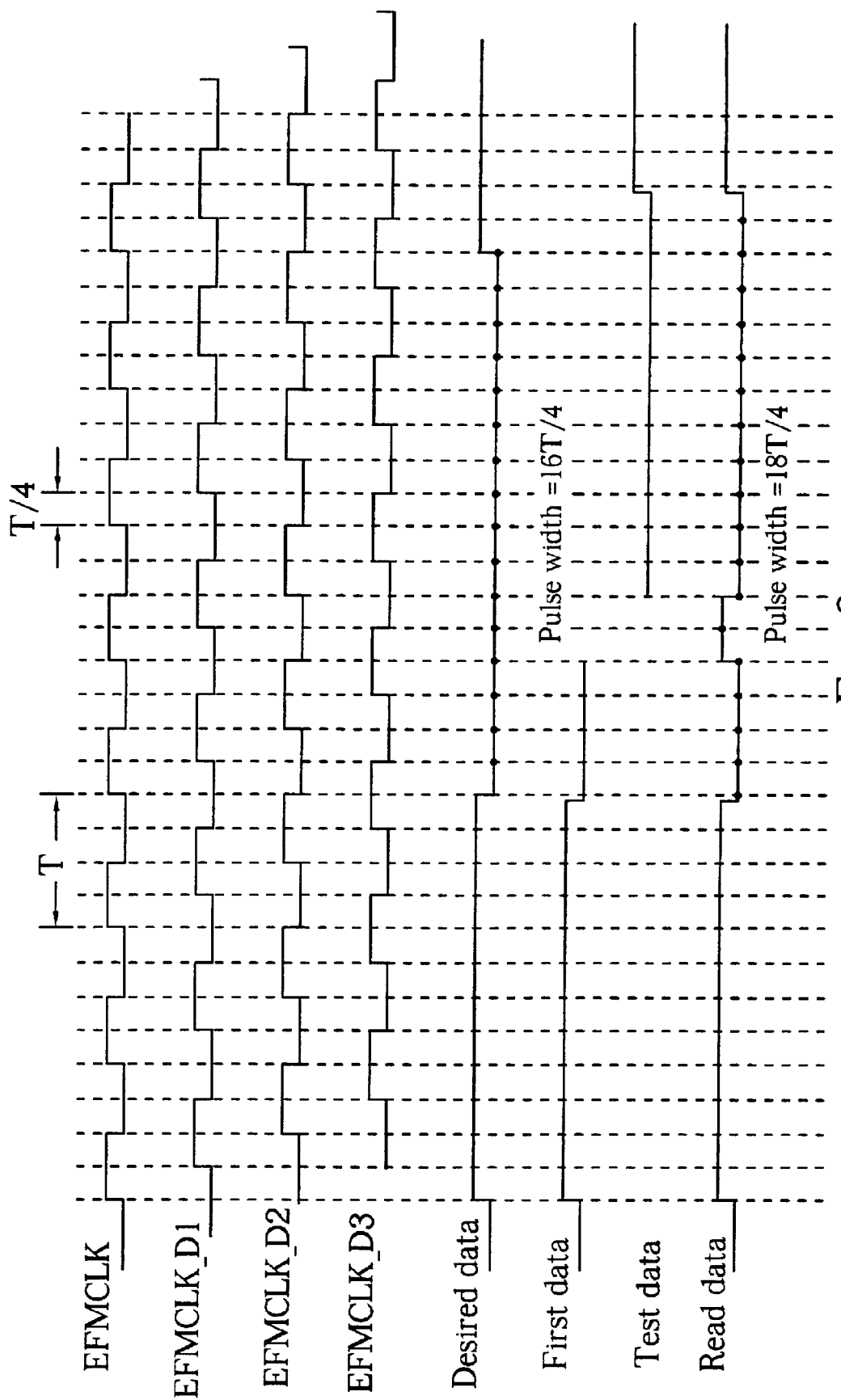
FIG. 8 is a timing diagram illustrating the present invention method for recording data onto an optical disc in multiple write sessions.

To better understand operation of the present invention optical disc apparatus 20, please refer to FIG. 8. FIG. 8 is a timing diagram illustrating the present invention method for recording data onto an optical disc in multiple write sessions. At the top of the timing diagram are the four EFM clock signals EFMCLK, EMFCLK_D1, EMFCLK_D2, and EMFCLK_D3, which are used by the comparison circuit 42 to clock data at each active clock edge. Also shown is desired data, which is stored in the memory 44. The desired data is data that was originally supposed to be written onto the optical disc before the interruption occurred while the desired data was being written. To begin the writing process, the optical disc apparatus 20 writes first data to the optical disc 12, the first data being a first portion of the desired data. Unfortunately, due to the write operation being terminated prematurely, the first data does not contain all of the desired data. Therefore, the read path circuit 16 reads data stored on the optical disc 12 and detects the ending location of the first data.

Next, a section of the desired data immediately following the first data, and which was not written with the first data, is test written onto the optical disc 12. Since only a test write is performed, the actual data portion of the optical disc 12 is not used to store this test data. After this, the read path circuit 16 reads first data and test data stored on the optical disc 12. The comparison circuit 42 of the delay detection circuit 25 then compares the desired data in the memory 44 to the read data. To accurately judge the value of the delay gap between the first data and the test data, a width of a data pulse that was present in the desired data during the write termination is compared against a corresponding pulse width in the read data. This pulse of the desired data will always have a pulse width between 3T and 11T. For example, as shown in FIG. 8, the desired data has a pulse width of 16T/4, or 16 segments of a T/4 period. However, the read data has a pulse width of 18T/4. Therefore, the read data pulse width is longer by a period of 2T/4. This difference in the two pulse widths is equal to the value of the delay gap. In other words, the beginning location of the test data is 2T/4 units after the ending location of the first data. The comparison circuit 42 then outputs this delay information to the write path circuit 19, 50 that the write path circuit can write second data 2T/4 time units earlier than the test data was written. This involves subtracting the value of the delay gap from the starting location of the test data in order to calculate the staring location of the second data. Finally, the second data is written such that there is no delay gap between the first data and the second data. Thus, after the first data and second data are written to the optical disc 12, the result looks exactly like the information stored in the desired data.

The example just discussed shows a case where the beginning location of the test data was located after the ending location of the first data. Therefore, the pulse width of the read data was longer than the corresponding pulse width of the desired data. The present invention could also correct the opposite problem, where the beginning location of the test data was located before the ending location of the first data. In this case, the pulse width of the read data would be shorter than the corresponding pulse width of the desired data. Therefore, the delay gap would have a negative value. Subtracting the value of the delay gap from the staring location of the test data would involve subtracting a negative value. In effect, this means the starting location of the second data would occur after the starting location of the test data.

Compared to the prior art method of writing data to an optical disc 12 in multiple write sessions, after a termination in writing first data to an optical disc 12, the present invention method first writes test data to the optical disc 12. A delay detection circuit 25 is then used for determining a delay gap between the first data and the test data. Finally, second data is written to the optical disc 12 such that a beginning location of the second data is equal to the beginning location of the test data minus a value contained in the gap. Therefore, in the case of a positive gap, synchronization is maintained between the first data and the second data, thereby preserving the information contained in the second data. In addition, in the case of a negative gap, the present invention method prevents portions of the first data from being overwritten by the second data.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for using an optical disc apparatus to record data onto an optical disc in multiple write sessions, the optical disc apparatus comprising a delay detection circuit for detecting gaps between data written to the optical disc in successive write sessions, the method comprising:

writing a set of first data to the optical disc;

searching for an ending location of the first data on the optical disc;

writing a set of test data to the optical disc such that a beginning location of the test data is approximately equal to the ending location of the first data;

using the delay detection circuit to detect a gap between the first data and the test data, the gap being calculated by subtracting the ending location of the first data from the beginning location of the test data; and writing a set of second data to the optical disc such that a beginning location of the second data is equal to the beginning location of the test data minus a value contained in the gap.

2. The method of claim 1 wherein the delay detection circuit of the optical disc apparatus further comprises a memory for storing desired data, which is data desired to be written onto the optical disc, and the method further comprises comparing the desired data to the first data and the test data in order to calculate the value of the gap between the first data and the test data.

3. The method of claim 2 wherein the set of first data and the set of test data are combined to form a set of read data, and the method further comprises comparing the desired data to the read data in order to calculate the value of the gap between the first data and the test data.

4. The method of claim 3 wherein the delay detection circuit of the optical disc apparatus further comprises a clock generating circuit for generating a set of clock pulses, and the method further comprises using the delay detection circuit to read values of the desired data and the read data at positive edges of the clock pulses so as to compare the desired data to the read data and calculate the value of the gap.

5. The method of claim 4 wherein the set of clock pulses is a plurality of EFM clock signals with identical frequency, each EFM clock signal being out of phase with other EFM clock signals, and the combination of the plurality of EFM clock signals producing a combined clock signal having a frequency that is a multiple of the EFM clock signal frequency.

6. An optical disc apparatus for recording data onto an optical disc in multiple write sessions, the optical disc apparatus comprising:

a write circuit for writing a set of first data to the optical disc;

a read circuit for reading an ending location of the first data on the optical disc and for instructing the write circuit to write a set of test data to the optical disc such that a beginning location of the test data is approximately equal to the ending location of the first data; and a delay detection circuit for detecting a gap between the first data and the test data, the gap being calculated by subtracting the ending location of the first data from the beginning location of the test data, and for instructing the write circuit to write a set of second data to the optical disc such that a beginning location of the second data is equal to the beginning location of the test data minus a value contained in the gap.

7. The apparatus of claim 6 wherein the delay detection circuit of the optical disc apparatus further comprises a memory for storing desired data, which is data desired to be written onto the optical disc, and the desired data is compared to the first data and the test data in order to calculate the value of the gap between the first data and the test data.

8. The apparatus of claim 7 wherein the set of first data and the set of test data are combined to form a set of read data, and the desired data is compared to the read data in order to calculate the value of the gap between the first data and the test data.

9. The apparatus of claim 8 wherein the delay detection circuit of the optical disc apparatus further comprises a clock generating circuit for generating a set of clock pulses, and the delay detection circuit is used to read values of the desired data and the read data at active edges of the clock pulses so as to compare the desired data to the read data and calculate the value of the gap.

10. The apparatus of claim 9 wherein the set of clock pulses is a plurality of EFM clock signals with identical frequency, each EFM clock signal being out of phase with other EFM clock signals, and the combination of the plurality of EFM clock signals producing a combined clock signal having a frequency that is a multiple of the EFM clock signal frequency.

* * * * *